US007987376B2

(12) United States Patent
Inoue et al.

(10) Patent No.: US 7,987,376 B2
(45) Date of Patent: Jul. 26, 2011

(54) POWER SUPPLY CONTROLLER CONFIGURED TO SUPPLY POWER TO EXTERNAL DEVICE AND MODULES OF COMPUTER SYSTEM ACCORDING TO THE SELECTED POWER SUPPLY MODE

(75) Inventors: Masayuki Inoue, Tokyo (JP); Terunobu Hara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 164 days.

(21) Appl. No.: 12/509,317

(22) Filed: Jul. 24, 2009

(65) Prior Publication Data
US 2010/0115296 A1 May 6, 2010

(30) Foreign Application Priority Data
Oct. 31, 2008 (JP) ................................. 2008-282326

(51) Int. Cl.
G06F 1/00 (2006.01)
(52) U.S. Cl. .......................... 713/300; 713/323; 713/324
(58) Field of Classification Search .................. 713/300, 713/323, 324
See application file for complete search history.

(56) References Cited

U.S. PATENT DOCUMENTS

| | | | | |
|---|---|---|---|---|
| 6,665,801 | B1* | 12/2003 | Weiss ............................. | 713/300 |
| 6,782,491 | B1* | 8/2004 | Foedlmeier et al. ............. | 714/37 |
| 7,451,328 | B2* | 11/2008 | Hsieh ............................. | 713/300 |
| 7,489,974 | B2* | 2/2009 | Numano ......................... | 700/22 |
| 7,853,815 | B2* | 12/2010 | Tsai et al. ...................... | 713/323 |
| 2006/0085659 | A1* | 4/2006 | Nishinaga et al. ............. | 713/320 |
| 2006/0117195 | A1 | 6/2006 | Niwa et al. | |
| 2009/0228722 | A1* | 9/2009 | Lin ................................. | 713/300 |
| 2010/0097030 | A1* | 4/2010 | Kim et al. ...................... | 320/106 |

FOREIGN PATENT DOCUMENTS

| | | |
|---|---|---|
| JP | 11-316625 A | 11/1999 |
| JP | 2001-242965 A | 9/2001 |
| JP | 2003-263245 A | 9/2003 |
| JP | 2004-032967 A | 1/2004 |
| JP | 2006-011865 A | 1/2006 |
| JP | 2006-018466 A | 1/2006 |
| JP | 2006-053748 A | 2/2006 |
| JP | 2006-277346 A | 10/2006 |
| JP | U 3127705 | 11/2006 |
| WO | WO 2005/022369 A1 | 3/2005 |
| WO | WO 2009/031235 A1 | 3/2009 |

OTHER PUBLICATIONS

Notice of Reasons for Rejection mailed by Japan Patent Office on Nov. 24, 2009 in the corresponding Japanese patent application No. 2008-282326.
Notice of Reasons for Rejection mailed by Japan Patent Office on Mar. 30, 2010 in the corresponding Japanese patent application No. 2008-282326.
Decision of a Patent Grant mailed by Japan Patent Office on Jul. 27, 2010 in the corresponding Japanese patent application No. 2008-282326.

* cited by examiner

Primary Examiner — Chun Cao
(74) Attorney, Agent, or Firm — Knobbe, Martens, Olson & Bear LLP (57) ABSTRACT

According to one embodiment, an information processor, which is capable of supplying power to an external device, includes a connector, a storage module, and a power supply control module. The connector connects the external device to the information processor. The storage module stores a plurality of power supply modes each defining conditions of respective modules of the information processor to make the external device connected to the connector chargeable. The power supply control module selects a power supply mode effective for the external device from the power supply modes when the external device is connected to the connector, and sets the respective modules of the information processor according to the conditions corresponding to the power supply mode selected.

5 Claims, 5 Drawing Sheets

| POWER SUPPLY MODE | STATE OF USB SIGNAL LINE ||
|---|---|---|
| | CLOCK LINE | DATA LINE |
| MODE 0 | H | H |
| MODE 1 | H | L |
| MODE 2 | L | H |
| MODE 3 | L | L |

FIG.6

POWER SUPPLY CONTROLLER CONFIGURED TO SUPPLY POWER TO EXTERNAL DEVICE AND MODULES OF COMPUTER SYSTEM ACCORDING TO THE SELECTED POWER SUPPLY MODE

CROSS-REFERENCE TO RELATED APPLICATIONS

This application is based upon and claims the benefit of priority from Japanese Patent Application No. 2008-282326, filed Oct. 31, 2008, the entire contents of which are incorporated herein by reference.

BACKGROUND

1. Field

One embodiment of the invention relates to a technology for supplying power to a device and, more particularly, to an information processor that supplies power to a device via a bus.

2. Description of the Related Art

Recent information processors such as a personal computer (PC) are provided with an interface for connection to other devices. Examples of the interface include a universal serial bus (USB) (registered trademark) and bus interfaces according to a standard such as IEEE 1394. The information processors are capable of supplying power to a device connected thereto through such a bus interface.

For example, Japanese Patent Application Publication (KOKAI) No. 2006-53748 discloses a conventional technology in which, even if the power is off or in power saving mode, an information processor starts supplying power to a device when the device is connected thereto via a bus interface.

It is not always the case that every time a device is connected to the bus interface, the information processor is capable of supplying power to the device through the bus interface. More specifically, it is not enough to simply connect a device to the bus interface because each device is supplied with power or is chargeable in a different condition. Therefore, it is necessary to specify the setting of the USB controller, power source circuit, or the like of the information processor to be suitable for a device connected thereto.

Generally, this setting is specified by selecting a setting suitable for the device from a plurality of settings with a predetermined tool such as a utility program installed in advance on the information processor. This means that the user is required to determine a setting to be selected for a device that the user has connected to the bus interface to charge the device.

If the user has recharged the same device a plurality of times, the user can determine the setting allowing the device to be rechargeable from experience. However, if the user charges a device for the first time, it may be difficult for the user to specify a setting to be selected to charge the device. In this case, the user has to select a plurality of settings one by one and repeatedly try charging the device with each selected setting to determine the one suitable for the device.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processor, which is configured to supply power to an external device, comprises a connector, a storage module, and a power supply control module. The connector is configured to connect the external device to the information processor. The storage module is configured to store a plurality of power supply modes each defining conditions of respective modules of the information processor to make the external device connected to the connector chargeable. The power supply control module is configured to select a power supply mode effective for the external device from the power supply modes when the external device is connected to the connector, and set the respective modules of the information processor according to the conditions corresponding to the power supply mode selected.

Figure 1:
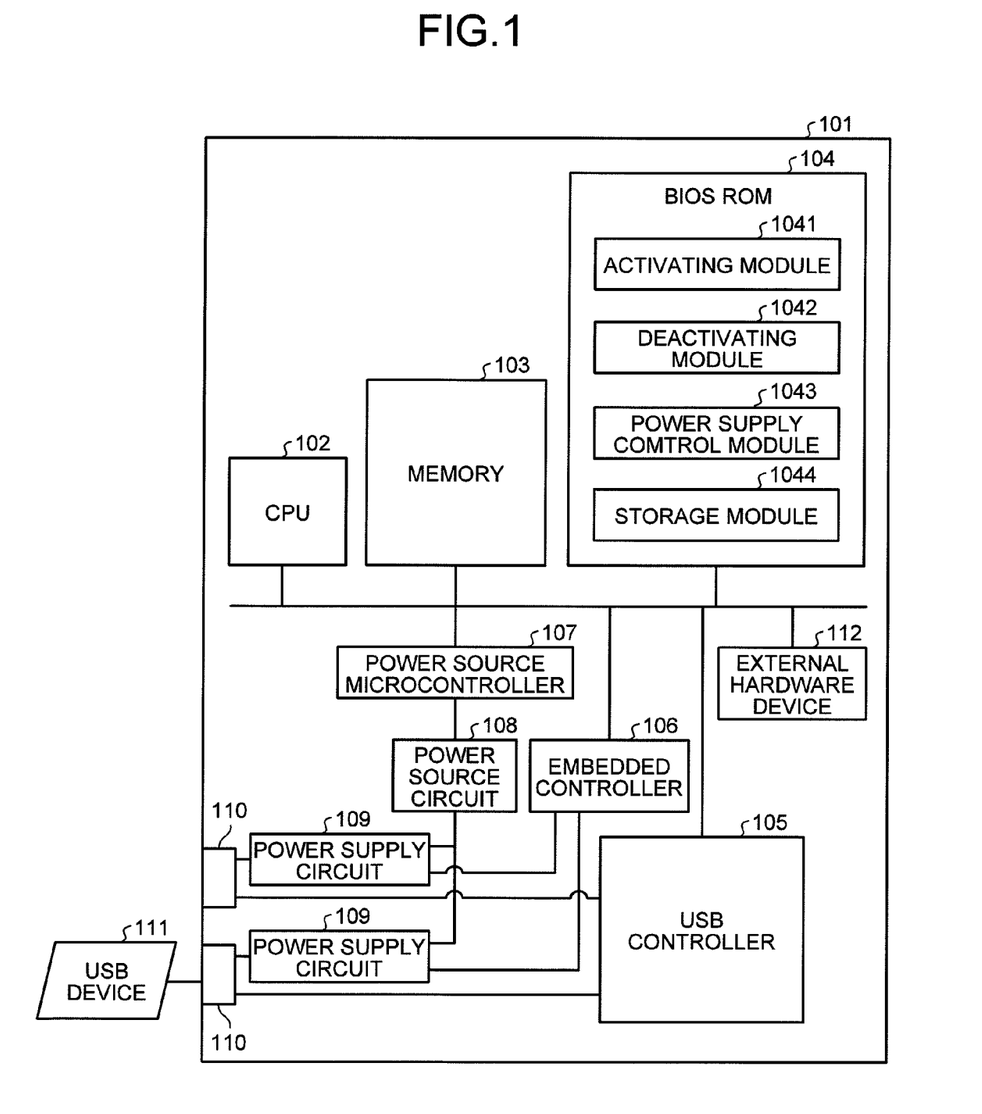
FIG. 1 is an exemplary block diagram of a computer according to an embodiment of the invention.

FIG. 1 is a block diagram of a computer 101 according to an embodiment of the invention. As illustrated in FIG. 1, the computer 101 comprises a CPU 102, a memory 103, a BIOS ROM 104, a universal serial bus (USB) controller 105, an embedded controller 106, a power source microcontroller 107, a power source circuit 108, power supply circuits 109, USB ports 110, and an external hardware device 112. Although a USB device 111 is described below as an example of a medium that is supplied with power from the computer 101, the medium may be a device according to a standard other than USB such as, for example, IEEE1394.

The CPU 102 controls the operation of the computer 101. The CPU 102 loads a system basic input/output system (BIOS) stored in the BIOS ROM 104 into the memory 103, and controls various types of hardware. The CPU 102 also loads an operating system (OS) stored in a hard disk (not illustrated) or the like into the memory 103 and executes it. In addition to the system BIOS and the OS, the CPU 102 executes various application programs.

The memory 103 is a main memory. The system BIOS stored in the BIOS ROM 104 as well as the OS and the application programs stored in a hard disk (not illustrated) or the like are loaded into the memory 103 and executed therein.

The BIOS ROM 104 is a memory that stores the system BIOS to specify various settings for hardware.

As illustrated in FIG. 1, the system BIOS implements, in the BIOS ROM 104, an activating module 1041, a deactivating module 1042, a power supply control module 1043, and a storage module 1044.

The activating module 1041 activates various types of hardware in the computer 101 according to an instruction from the power source microcontroller 107 or the power supply control module 1043, which will be described later. With this, the computer 101 wakes up from a mode, in which it is idle or not in operation, such as in standby or sleep mode, in hibernation mode, or when shut down, but power is supplied to the USB controller 105 and the power supply circuits 109.

More specifically, in response to an instruction from the outside to activate hardware, the activating module 1041 determines whether the instruction is received from the power source microcontroller 107 or the power supply control module 1043. When determining that the instruction is received from the power supply control module 1043, the activating module 1041 determines whether USB power supply is set to be enabled with respect to the USB ports 110. Incidentally, as will be described later, the instruction is received from the power supply control module 1043 when USB wake-up setting has been specified.

The term "USB wake-up setting" as used herein refers to a setting which enables USB power supply when the USB device 111 is connected to one of the USB ports 110 under the condition that the computer 101 is idle but power is supplied to the USB controller 105 and the power supply circuits 109.

Figure 2:
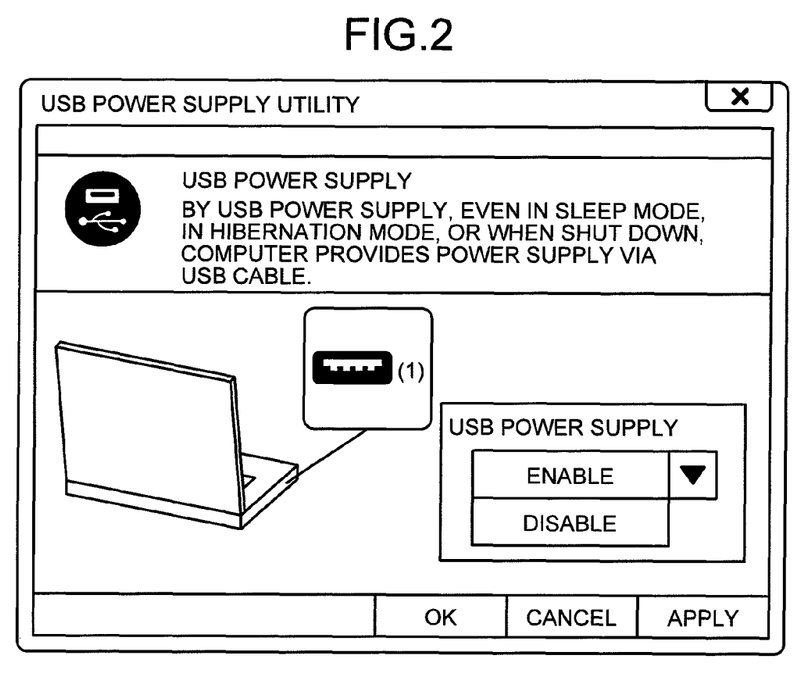
FIG. 2 is an exemplary schematic diagram of screen display for specifying a setting to enable or disable USB power supply in the embodiment.

Besides, whether to enable or disable USB power supply may be set by, for example, a tool such as a utility program installed on the computer 101 for specifying settings of USB power supply as illustrated in FIG. 2. FIG. 2 illustrates an example of a pulldown menu displayed on a display device (not illustrated) by the utility program for specifying a setting to enable or disable USB power supply. As will be described later, information on whether USB power supply is set to "enable" or "disable" is stored in the storage module 1044 with respect to each of the USB ports 110.

Having determined that the instruction is received from the power supply control module 1043 and USB power supply is set to "enable" for the USB ports 110, the activating module 1041 notifies the power supply control module 1043 of this fact.

On the other hand, when determining that the instruction is not received from the power supply control module 1043 but received from the power source microcontroller 107, the activating module 1041 initializes various types of hardware in the computer 101. In addition, even when determining that the instruction is received from the power supply control module 1043, if determining that USB power supply is not set to "enable" for the USB ports 110, the activating module 1041 also initializes various types of hardware in the computer 101.

For example, the activating module 1041 initializes the settings of video graphic array (VGA), integrated device electronics (IDE), and the like. After the initialization, the activating module 1041 activates the OS to allow the user to use the computer 101.

Referring back to FIG. 1, the deactivating module 1042 deactivates various types of hardware of the computer 101 according to an instruction from an application such as the OS. With this, the computer 101 enters the mode in which it is idle or not in operation but power is supplied to the USB controller 105 and the power supply circuits 109.

More specifically, when an application such as the OS is shut down, the deactivating module 1042 saves the settings of VGA, IDE, and the like.

After saving the settings of VGA, IDE, and the like, the deactivating module 1042 determines whether USB power supply is set to "enable" for a particular one of the USB ports 110. As described above, whether to enable or disable USB power supply for the USB ports 110 is set by the utility program as illustrated in FIG. 2, and this information is stored in the storage module 1044.

When determining that USB power supply is set to "enable" for the USB port 110, the deactivating module 1042 determines whether the USB controller 105 has detected a signal that indicates that the USB device 111 is connected to the USB port 110.

The power supply control module 1043 determines power supply mode to provide efficient USB power supply to the USB device 111 and specifies various settings for USB power supply such as to specify the USB wake-up setting.

The term "power supply mode" as used herein defines a combination of the conditions of respective modules of the computer 101, such as the USB controller 105, the power source circuit 108, and the external hardware device 112 to switch the USB device to charge mode.

For example, the power supply mode may define a combination of the state or level of control signals, i.e., ON/OFF or H (high)/L (low), for the respective modules of the computer 101, such as the USB controller 105, the power source circuit 108, and the external hardware device 112. As will be described later, such settings of the power supply mode are stored in the storage module 1044.

Figure 3:
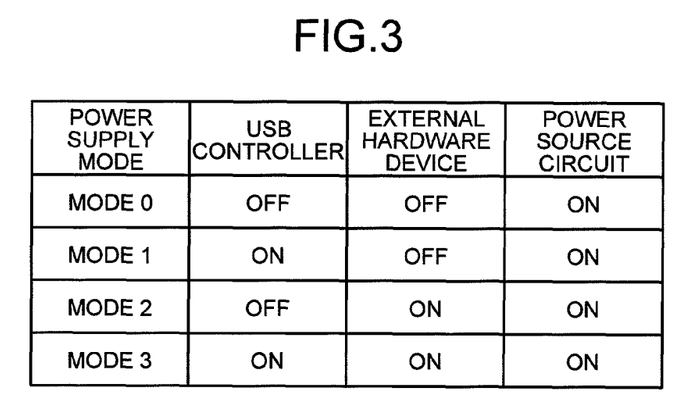
FIG. 3 is an exemplary schematic diagram for explaining power supply modes stored in a storage module illustrated in FIG. 1 in the embodiment.

FIG. 3 is a schematic diagram of an example of power supply modes stored in the storage module 1044. In the example of FIG. 3, a combination of the USB controller 105, the power source circuit 108, and the external hardware device 112 is used for the definition of the power supply mode.

More specifically, FIG. 3 illustrates that, when the power supply mode is set to "mode 0", the power source circuit 108 is set for USB power supply, while the USB controller 105 and the external hardware device 112 are not set for USB power supply.

Similarly, when the power supply mode is set to "mode 1", the USB controller 105 and the power source circuit 108 are set for USB power supply. When the power supply mode is set to "mode 2", the power source circuit 108 and the external hardware device 112 are set for USB power supply. When the power supply mode is set to "mode 3", the USB controller 105, the power source circuit 108, and the external hardware device 112 are set for USB power supply.

Figure 4:
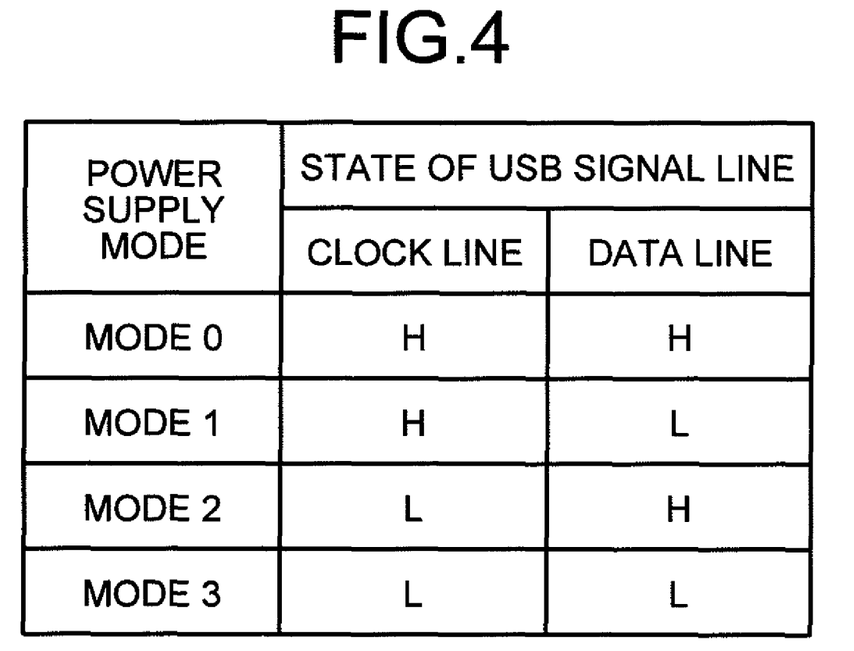
FIG. 4 is an exemplary schematic diagram for explaining power supply modes stored in an external hardware device illustrated in FIG. 1 in the embodiment.

Each of the power supply modes is described above as defining a combination of "ON" or "OFF" state of the respective modules. However, in practice, in the case of, for example, the external hardware device 112, each of the power supply modes is associated with the signal levels of signal lines of the USB device 111. More specifically, as illustrated in FIG. 4, with respect to each of the power supply modes, the signal level of a signal line 1 (clock line) and a signal line 2 (data line) of the USB device 111 is set to "H" or "L".

As described above, according to the embodiment, a plurality of power supply modes are provided because each USB device requires different settings of the computer 101 to be chargeable.

Referring back to FIG. 1, when the deactivating module 1042 determines that USB power supply is set to "enable" for the USB port 110 and also the USB controller 105 has detected that the USB device 111 is connected to the USB port 110, or having notified by the activating module 1041 that USB power supply is set to "enable" for the USB port 110 in the activation process, the power supply control module 1043 stores the next power supply mode in the storage module 1044. For example, if the storage module 1044 stores "mode 0" as the power supply mode, the next power supply mode, i.e., "mode 1", is stored in the storage module 1044 as the current power supply mode.

According to the power supply mode stored in the storage module 1044, the power supply control module 1043 sets respective modules such as the USB controller 105, the power source circuit 108, and the external hardware device 112. In this state where the modules have been set, the power supply control module 1043 obtains the value of current that the power source microcontroller 107 supplies to the power supply circuits 109 (hereinafter, "supply current value"), and stores the supply current value in the storage module 1044 with respect to each of the power supply modes.

After storing a supply current value corresponding to the current power supply mode in the storage module 1044, in the manner as described above, the power supply control module 1043 obtains a supply current value corresponding to the next power supply mode. Having stored supply current values in the storage module 1044 for all the power supply modes, the power supply control module 1043 compares the respective supply current values to determine whether there is a supply current value that allows setting of effective power supply mode.

More specifically, the power supply control module 1043 compares a supply current value in each of the power supply modes with a current value (hereinafter, "current threshold") stored in advance in the storage module 1044 as a reference for USB power supply. Thus, the power supply control module 1043 determines whether there is any supply current value that exceeds the current threshold. When determining that there is a supply current value that exceeds the current threshold, the power supply control module 1043 stores the power supply mode in which it obtains the supply current value in the storage module 1044 as the effective power supply mode for USB power supply. According to the power supply mode thus stored, the power supply control module 1043 sets respective modules.

Further, when the deactivating module 1042 determines that a signal has not been detected that indicates that the USB device 111 is connected to the USB port 110, or when determining that there is no supply current value that allows setting of effective power supply mode, the power supply control module 1043 specifies the USB wake-up setting for the USB port 110. Then, the power supply control module 1043 instructs the activating module 1041 of the BIOS ROM 104 to perform the activation process.

The storage module 1044 stores various types of settings for USB power supply. More specifically, the storage module 1044 stores the current threshold, effective power supply mode for USB power supply, and a supply current value with respect to each of the power supply modes. The storage module 1044 further stores combinations as illustrated in FIGS. 3 and 4 for the respective power supply modes, the USB wake-up setting, and settings to "enable" or "disable" USB power supply as illustrated in FIG. 2.

Referring back to FIG. 1, the USB controller 105 detects, when the USB device 111 is connected to one of the USB ports 110, a signal indicating that the USB device 111 is connected to the USB port 110. In addition, the USB controller 105 controls various types of commands and data for the USB device 111 connected to the USB port 110.

The embedded controller 106 controls the power supply of the computer 101. More specifically, when the deactivating module 1042 determines that USB power supply is not set to be enabled, or when the power supply control module 1043 determines that there is no supply current value that allows setting of effective power supply mode, the embedded controller 106 disables USB power supply for the USB port 110. In this case, for example, the embedded controller 106 cuts the connection between the power supply circuits 109 and the USB port 110.

As described above, the USB wake-up setting is specified when it is determined that the USB device 111 is not connected to the USB port 110. This is because even if the user erroneously connects a device such as, for example, a mouse, which is not originally an object of USB power supply, to the USB port 110, when a USB device with a battery, which is an object of USB power supply, is connected thereto, the USB wake-up setting automatically enables USB power supply to the USB device.

The power source microcontroller 107 supplies current to the power supply circuits 109 and respective modules in the computer 101, and also monitors the voltage state of them. Further, when the power source circuit 108 detects a signal issued in response to the depression of a power button (not illustrated), the power source microcontroller 107 instructs the activating module 1041 of the BIOS ROM 104 to perform the activation process.

The power source circuit 108 controls the power of the main body of the computer 101 as well as detecting a signal issued in response to the depression of a power button (not illustrated).

The power supply circuits 109 each supply power to the USB ports 110 even if the deactivating module 1042 has deactivated various types of hardware.

The USB ports 110 connect between the power supply circuits 109 and the USB device 111, respectively.

The USB device 111 is a medium capable of communication or provision/receipt of data according to a method defined by the USB standard. Examples of the USB device 111 include a flash memory and a hard disk.

The external hardware device 112 is an external circuit other than hardware that generally controls power supply such as the BIOS ROM 104, the USB controller 105, and the power source circuit 108. As described above, the power supply mode defines a combination of the conditions of the modules including the external hardware device 112. This is because, by only hardware that generally controls power supply such as the BIOS ROM 104, the USB controller 105, and the power source circuit 108, effective power supply may not be provided to the USB device 111.

A description will now be given of a deactivation process performed by the computer 101.

Figure 5:
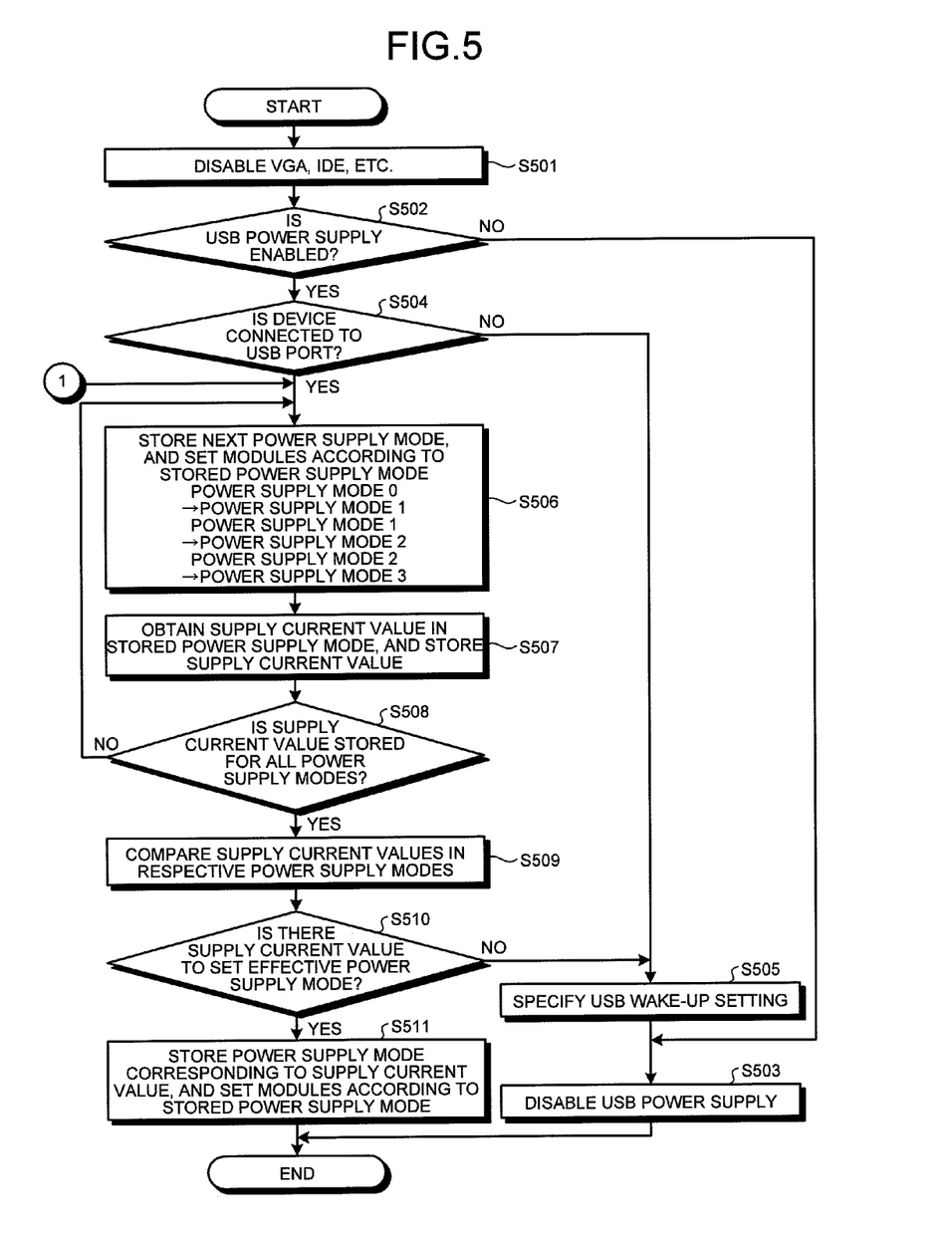
FIG. 5 is an exemplary flowchart of the process performed when the computer enters, from active mode, a mode in which USB wake-up setting is specified in the embodiment.

FIG. 5 is a flowchart of the process performed when the computer 101 enters, from active mode, a mode in which the USB wake-up setting is specified. In the following, it is assumed that the user instructs to shut down an application on the computer 101 such as the OS.

As illustrated in FIG. 5, on receipt of an instruction to shut down an application such as the OS, the deactivating module 1042 performs processing such as to save the settings of VGA, IDE, and the like (S501).

After that, the deactivating module 1042 determines whether USB power supply is set to be enabled for a particular one of the USB ports 110 (S502).

When the deactivating module 1042 determines that USB power supply is not set to be enabled for the USB port 110 (No at S502), the embedded controller 106 sets USB power supply disabled for the USB ports 110 (S503).

On the other hand, when determining that USB power supply is set to be enabled for the USB port 110 (Yes at S502), the deactivating module 1042 determines whether the USB controller 105 has detected a signal that indicates that the USB device 111 is connected to the USB port 110 (S504).

When the deactivating module 1042 determines that the USB controller 105 has not detected a signal that indicates that the USB device 111 is connected to the USB port 110 (No at S504), the power supply control module 1043 specifies the USB wake-up setting for the USB port 110 (S505). Then, the power supply control module 1043 instructs the activating module 1041 of the BIOS ROM 104 to perform the activation process. After the process at S505, the process moves to S503, and the embedded controller 106 sets USB power supply disabled for the USB ports 110.

On the other hand, when the deactivating module 1042 determines that the USB controller 105 has detected a signal that indicates that the USB device 111 is connected to the USB port 110 (Yes at S504), the power supply control module 1043 stores in the storage module 1044 power supply mode next to the one currently stored therein as the current power supply mode, and sets respective modules according to the power supply mode thus stored (S506). The power supply control module 1043 then obtains a supply current value in the stored power supply mode, and stores the supply current value in the storage module 1044 in association with the power supply mode (S507). Thereafter, the power supply control module 1043 determines whether supply current values have been stored in the storage module 1044 for all the power supply modes (S508).

When the power supply control module 1043 determines that supply current values have not yet been stored in the storage module 1044 for all the power supply modes (No at S508), the process returns to S506, and the process at S506 and S507 is repeated.

On the other hand, when determining that supply current values have been stored in the storage module 1044 for all the power supply modes (Yes at S508), the power supply control module 1043 compares the respective supply current values (S509) to determine whether there is a supply current value to set effective power supply mode (S510).

Having determined that there is a supply current value to set effective power supply mode (Yes at S510), the power supply control module 1043 stores the power supply mode in which it obtains the supply current value in the storage module 1044 as the effective power supply mode for USB power supply. According to the effective power supply mode thus stored, the power supply control module 1043 sets respective modules such as the USB controller 105, the power source circuit 108, or the external hardware device 112 (S511).

On the other hand, when the power supply control module 1043 determines that there is no supply current value to set effective power supply mode (No at S510), the process moves to S505 and then S503.

On completion of the process at S511 or S503, the deactivation process of the embodiment ends.

A description will then be given of an activation process performed by the computer 101.

Figure 6:
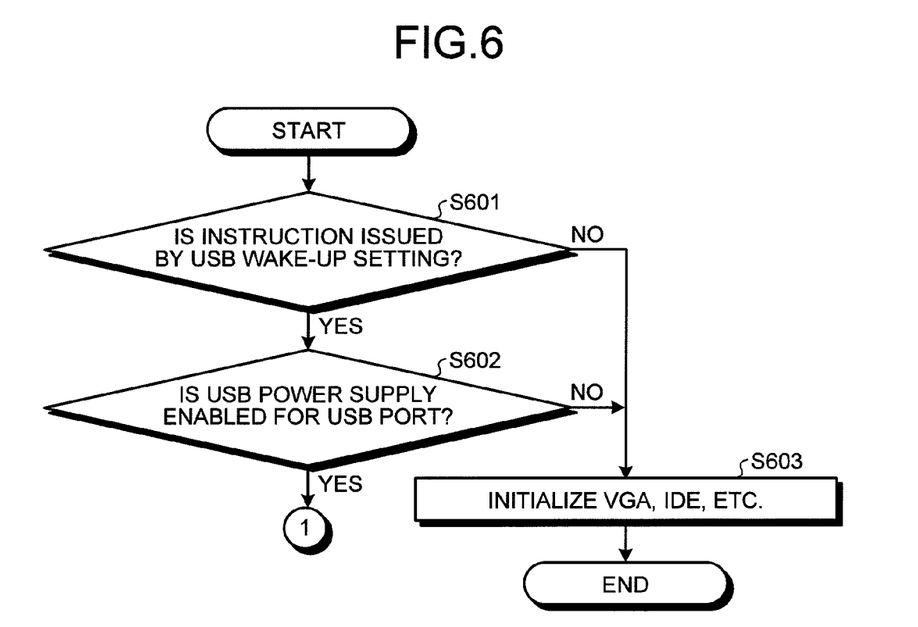
FIG. 6 is an exemplary flowchart of the process performed when the computer 101 wakes up from the mode in which the USB wake-up setting is specified in the embodiment.

FIG. 6 is a flowcharts of the process performed when the computer 101 wakes up from the mode in which the USB wake-up setting is specified. In the following, it is assumed that the power source microcontroller 107 or the power supply control module 1043 issues an instruction to perform the activation process.

As illustrated in FIG. 6, on receipt of an instruction to perform the activation process, the activating module 1041 determines whether the instruction is received from the power source microcontroller 107 or the power supply control module 1043. That is, the activating module 1041 determines whether the instruction is issued by the USB wake-up setting (S601).

When determining that the instruction is issued by the USB wake-up setting (Yes at S601), the activating module 1041 determines whether USB power supply is set to be enabled for a particular one of the USB ports 110 (S602).

Having determined that USB power supply is set to be enabled for the USB port 110 (Yes at S602), the activating module 1041 notifies the deactivating module 1042 of this fact. After that, the process moves to S506 in FIG. 5, and the deactivating module 1042 performs the deactivation process after S506.

On the other hand, when determining that the instruction is not issued by the USB wake-up setting (No at S601), the activating module 1041 initializes VGA, IDE, and the like (S603). In addition, when determining that USB power supply is not set to be enabled for the USB port 110 (No at S602), the activating module 1041 also initializes VGA, IDE, and the like (S603). After the completion of the process at S603, the activating module 1041 activates the OS on the computer 101 so that the user can use the computer 101, and the activation process of the embodiment ends.

As described above, according to the embodiment, the storage module 1044 stores a plurality of power supply modes each defining the conditions of respective modules of the computer 101 to make the USB device 111 connected thereto chargeable. When the USB device 111 is connected to the computer 101, the power supply control module 1043 selects a power supply mode effective for the USB device 111 from the plurality of power supply modes, and sets respective modules of the computer 101 according to the selected power supply mode. Thus, it is possible to easily set power supply suitable for each device without bothering the user.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processor capable of supplying power to an external device, the information processor comprising:
a connector configured to connect the external device to the information processor;
a storage module configured to store, when the information processor is idle and has been deactivated so that power is supplied only to modules necessary for supplying power to the external device among modules controlling power supply for putting the external device connected to the information processor in a chargeable condition, a plurality of power supply modes defining conditions of each of the modules; and
a power supply module configured to select an effective power supply mode for the external device from among the power supply modes when the external device is connected to the connector, to set the conditions with respect to the modules according to the selected power supply mode, and to supply power to the external device, the power supply module performing wake-u setting enabling power supply to the external device connected to the information processor which has been deactivated when there is no effective power supply mode for the external device in the power supply modes.

2. The information processor of claim 1, further comprising a power supply configured to supply current to the external device when the conditions are set with respect to the modules, wherein the storage module is configured to further store a current threshold as a reference current for power supply to the external device, and a module for the setting is configured to determine whether a current supplied to the external device is equal to or higher than the current threshold, and to select a power supply mode in which a current supplied to the external device is equal to or higher than the current threshold of the selected as the effective power supply mode.

3. The information processor of claim 2, further comprising a deactivating module configured to deactivate the modules, wherein the module for the setting is configured to determine whether a current supplied to the external device is equal to or higher than the current threshold with respect to the power supply modes when the deactivating module deactivates the modules.

4. The information processor of claim 1, wherein the power supply modes are each defined by combinations of the conditions of the modules.

5. The information processor of claim 1, wherein the storage module is configured to further store information on whether to enable power supply for the external device, and the power supply controller is configured to select, when the power supply is enabled for the external device, the effective power supply mode for the external device, and to set the conditions with respect to the modules according to the selected power supply mode.

* * * * *